(12) United States Patent
Becerra et al.

(10) Patent No.: US 8,963,478 B2
(45) Date of Patent: Feb. 24, 2015

(54) DRIVE CIRCUITS AND SYSTEMS FOR MOTOR CONTROLLER PROTECTION

(71) Applicant: Regal Beloit America, Inc., Beloit, WI (US)

(72) Inventors: Roger Carlos Becerra, Fort Wayne, IN (US); Yao Da, Fort Wayne, IN (US); David Allen Clendenen, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 124 days.

(21) Appl. No.: 13/660,026

(22) Filed: Oct. 25, 2012

(65) Prior Publication Data
US 2014/0118867 A1     May 1, 2014

(51) Int. Cl.
*H02P 3/18*     (2006.01)
(52) U.S. Cl.
USPC ............................ 318/762; 318/800; 318/801

(58) Field of Classification Search
USPC ................ 318/762, 800, 801; 363/65; 361/33
See application file for complete search history.

(56) References Cited

U.S. PATENT DOCUMENTS

| | | | |
|---|---|---|---|
| 5,321,575 A | 6/1994 | Shilo | |
| 5,555,150 A | 9/1996 | Newman, Jr. | |
| 5,694,006 A * | 12/1997 | Konopka | ...................... 315/219 |
| 7,312,970 B2 | 12/2007 | Skinner | |
| 2011/0133557 A1* | 6/2011 | Reilly | .............................. 307/66 |
| 2012/0026639 A1 | 2/2012 | Wright et al. | |

* cited by examiner

*Primary Examiner* — Karen Masih
(74) *Attorney, Agent, or Firm* — Armstrong Teasdale LLP

(57) ABSTRACT

Protection of a motor controller from a transient voltage and/or an over-voltage condition is described. A drive circuit includes a rectifier portion and at least one inductive device coupled to the rectifier portion. The drive circuit further includes at least one voltage clamping device coupled in parallel with the at least one inductive device, and at least one switching device configured to open as a function of a direct current (DC) link voltage value.

19 Claims, 7 Drawing Sheets

DRIVE CIRCUITS AND SYSTEMS FOR MOTOR CONTROLLER PROTECTION

BACKGROUND

The field of the disclosure relates generally to electric motors, and more specifically, to protecting electric motor control circuits from transient and/or over-voltage conditions.

Electric motors are used in countless varieties and applications worldwide. For example, electric motors are included within heating, ventilation, and air conditioning (HVAC) applications. Such electric motors include motor controllers for controlling the electric motors. Theses motor controllers include drive circuits for sending operational signals to drive the electric motors. These motor controllers may be subject to transient voltages and/or over-voltage conditions that can damage motor controller components and/or the electric motor.

Transient voltages may be caused by events external to the HVAC application, for example, power surges. Power surges may be caused by numerous different external forces, most typically, from lightning strikes. Transient voltages generally produce a voltage surge of up to 6000 volts. Typical protection devices for transient voltage protection include clamping circuits positioned in the filter circuit between the power supply and the motor controller. More specifically, some known protection devices connect metal oxide varistors (MOV) in a "Y" connection across the three-phase power lines. However, the clamping voltage of MOVs are usually twice the maximum allowable direct current (DC) voltage, therefore the voltage rating of the rectifier in the motor controller must be at least twice the working DC voltage. This results in larger physical volume and higher costs. For example, in a 56 frame electric motor where $V_{RMS}$=460V, twice line voltage leads to $V_{DC}$=1400V. Thus, the clamping voltage of the MOV must be around 2800V. No rectifier currently exists in the market with such a voltage rating that can be fit in a 56 frame motor enclosure.

Over-voltage conditions typically occur when there are faults in capacitor banks used for power factor correction in the power distribution system. These faults may introduce DC line over-voltages up to twice the normal value of DC line voltages. These over-voltage conditions may burn fuses in electric motors or even cause damage to them. When fuses are burned, technicians must replace them and reset the machine, which is costly.

BRIEF DESCRIPTION

In one aspect, a drive circuit is provided. The drive circuit includes a rectifier portion, at least one inductive device coupled to the rectifier portion, and at least one voltage clamping device coupled in parallel with the inductive device.

In yet another aspect, a drive circuit is provided. The drive circuit includes a rectifier portion and at least one switching device configured to open as a function of a direct current (DC) link voltage value.

In yet another aspect, a system is provided. The system includes a motor controller and an electric motor coupled to the motor controller. The electric motor is configured to receive an operating signal from the motor controller. The system also includes a drive circuit coupled to the motor controller. The drive circuit is configured to provide electrical power and control signals to the electric motor. The drive circuit includes a rectifier portion, at least one inductive device coupled to the rectifier portion, at least one voltage clamping device coupled in parallel to the inductive device, and at least one switching device configured to open as a function of a DC link voltage value.

In yet another aspect, a drive circuit is provided. The drive circuit includes a rectifier portion and at least one inductive device coupled to the rectifier portion. The drive circuit further includes at least one voltage clamping device coupled in parallel with the at least one inductive device, and at least one switching device configured to open as a function of a direct current (DC) link voltage value.

DETAILED DESCRIPTION

The methods and systems described herein facilitate transient voltage and over-voltage condition protection for an electric motor. The transient voltage is reduced or eliminated by using a voltage clamping device to limit the voltage delivered to the electric motor. The over-voltage condition is eliminated by disconnecting the drive circuit from an inverter portion of the motor controller.

Figure 1:
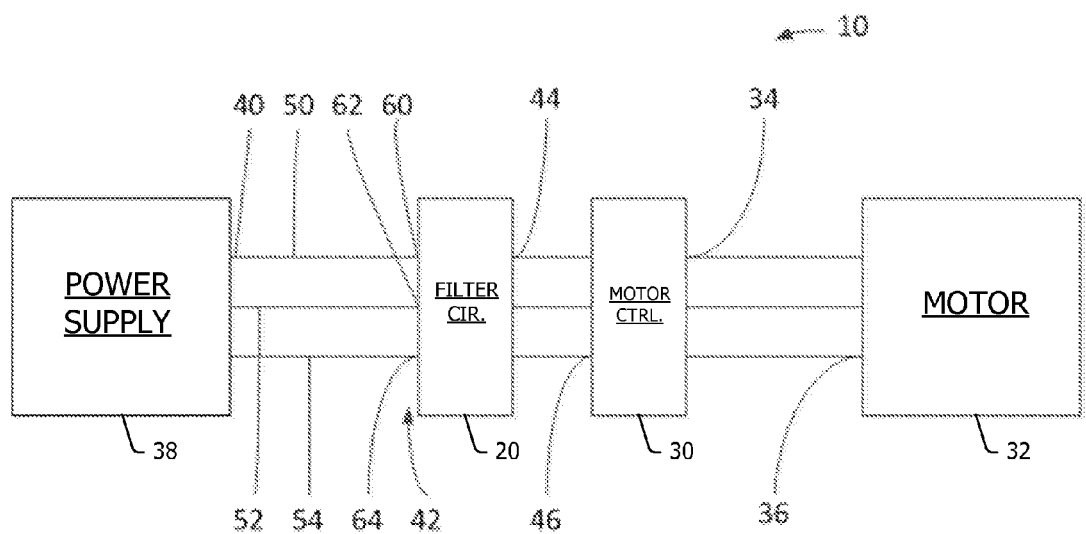
FIG. 1 is a block diagram of an exemplary motor control system.

FIG. 1 is a block diagram of an exemplary motor control system 10 that includes a motor controller 30. In the exemplary embodiment, motor controller 30 is coupled to an alternating current (AC) electric motor 32. Although illustrated as separate components, motor controller 30 and electric motor 32 may be included within a single housing. An operating signal output 34 of motor controller 30 is coupled to an input 36 of electric motor 32. Motor controller 30 provides electric motor 32 with operating signals, for example, but not limited to, a sine wave operating signal, a square wave operating signal, or any other suitable operating signal that allows system 10 to function as described herein. The operating signals direct operation of electric motor 32.

In the exemplary embodiment, motor control system 10 also includes a power supply 38, such as a one-hundred and twenty volt AC power supply, a two-hundred and forty volt AC power supply, or any other suitable power supply that allows system 10 to function as described herein. An output power line 40 of power supply 38 is coupled to an input 42 of filter circuit 20 and an output 44 of filter circuit 20 is coupled to an input 46 of motor controller 30. In the exemplary embodiment, output power line 40 includes three conductors: a first line conductor 50, a second line conductor 52, and a ground conductor 54. In some embodiments, first line conductor 50 is referred to as L1 and second line conductor 52 is referred to as L2 or a neutral conductor. In other embodiments, such as three phase systems, there may be four conductors L1, L2, L3, and a ground conductor. In the exemplary embodiment, ground conductor 54 is typically coupled to earth ground. However, ground conductor 54 may be coupled to a chassis ground or any other grounding that allows system 10 to function as described herein.

Filter circuit 20 may include, but is not limited to, an electromagnetic interference (EMI) filter circuit. In the exemplary embodiment, filter circuit 20 is configured to condition electricity provided to motor controller 30 via power line 40. For example, filter circuit 20 may suppress EMI within system 10. EMI is defined generally as any undesirable electromagnetic emission or any electrical electronic disturbance, man-made or neutral, which causes an undesirable response, malfunctioning or degradation in the performance of electrical equipment.

In the exemplary embodiment, input 42 of filter circuit 20 includes a first AC line input terminal 60 for coupling filter circuit 20 to first line conductor 50. Input 42 also includes a second AC line input terminal 62 for coupling filter circuit 20 to second line conductor 52. Furthermore, input 42 includes a ground terminal 64 for coupling filter circuit 20 to ground conductor 54. In some embodiments, second AC line input terminal 62 may also be referred to as neutral line input terminal 62.

Figure 2:
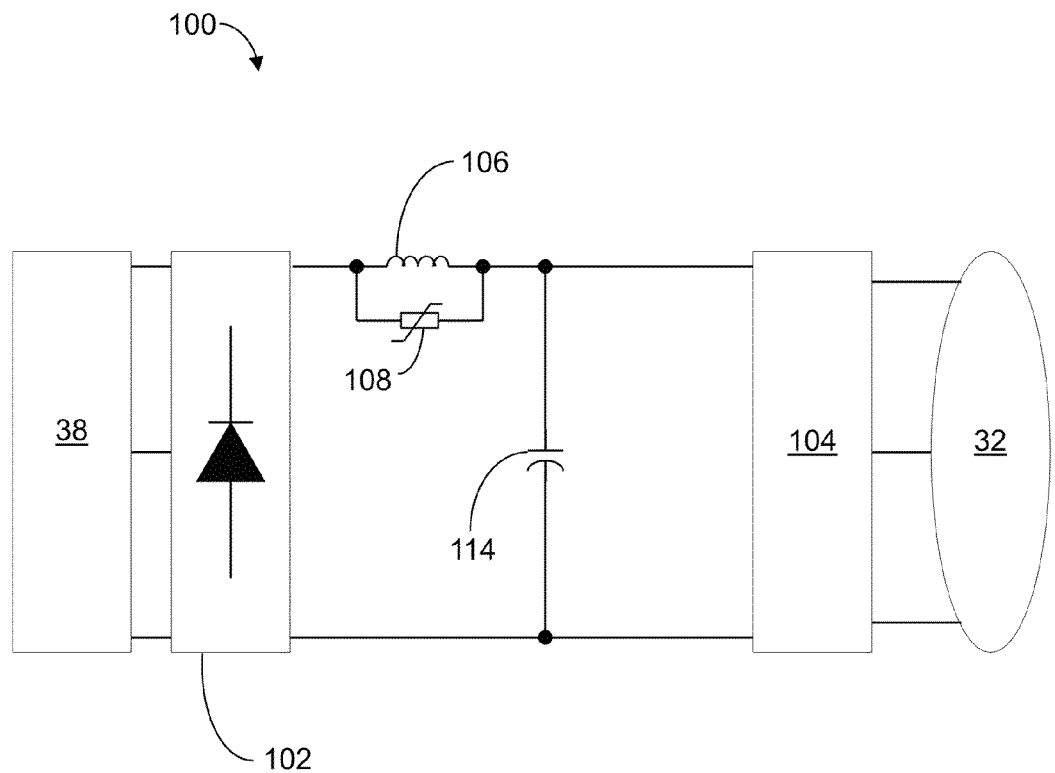
FIG. 2 is a block diagram of an exemplary drive circuit that includes transient voltage protection that may be used with the motor controller shown in FIG. 1.

FIG. 2 is a circuit diagram of an exemplary drive circuit 100 having transient voltage protection. In the exemplary embodiment, drive circuit 100 is included within motor controller 30 (shown in FIG. 1). Drive circuit 100 provides electrical power and control signals to electric motor 32. In the exemplary embodiment, drive circuit 100 is a variable frequency drive and/or an adjustable speed drive. In the exemplary embodiment, drive circuit 100 includes a rectifier portion 102, at least one inductive device 106 coupled to rectifier portion 102, and at least one voltage clamping device 108 coupled in parallel with inductive device 106.

In the exemplary embodiment, rectifier portion 102 converts an AC input voltage received from power supply 38 (shown in FIG. 1) to a DC voltage output. During normal operation, AC input voltage includes a range from about 230+/−15% $V_{RMS}$ to about 460+/−10% $V_{RMS}$. In the exemplary embodiment, rectifier portion 102 is a bridge rectifier. In some embodiments, drive circuit 100 may include at least one filter capacitor 114 coupled to rectifier portion 102 and an inverter portion 104. Rectifier portion 102 and filter capacitor 114 generate a smoothed DC voltage which is applied to inverter portion 104. Inverter portion 104 receives the DC voltage and generates a three-phase AC voltage to drive electric motor 32. Inductive device 106 is coupled to rectifier portion 102 and inverter portion 104 for power factor correction of the AC input source.

In the exemplary embodiment, drive circuit 100 includes voltage clamping device 108 coupled in parallel with inductive device 106. In the exemplary embodiment, voltage clamping device 108 is a metal oxide varistor (MOV). In alternative embodiments, voltage clamping device 108 may be a Zener diode, a transient voltage suppression (TVS) diode, a gas-filled tube, or any other voltage clamping device that enables drive circuit 100 to function as described herein. Voltage clamping device 108 is configured to clamp a transient voltage across bridge rectifier 102 below a rated maximum voltage level of bridge rectifier 102. Suppressing transient voltages facilitates preventing damage to components coupled to drive circuit 100 caused by exposure to a transient voltage. In the exemplary embodiment, voltage clamping device 108 has a clamping voltage of approximately 395V. When a transient voltage event occurs, voltage clamping device 108 clamps the voltage across the bridge rectifier to approximately 1.8 kV, while DC link voltage (i.e., voltage across filter capacitor 114) is limited to approximately 1.1 kV. Voltage clamping device 108 is configured to protect motor controller 30 and/or electric motor 32 from voltage transients up to 6000 $V_{DC}$.

In the exemplary embodiment, during normal operation of motor control system 10 (i.e. $V_{RMS}$ ranges from 230V to 460V), voltage clamping device 108 has high impedance and operates as an open circuit. This high impedance prevents current from flowing from rectifier portion 102 through voltage clamping device 108. However, during normal operation, inductive device 106 has low impedance, enabling current to flow through inductive device 106 to inverter portion 104. Because voltage clamping device 108 is positioned in parallel with inductive device 106, voltage clamping device 108 does not affect the function of drive circuit 100 during normal operation.

During a voltage transient event (i.e. approximately 6000V from input power supply 38), inductive device 106 has high impedance and operates as an open circuit. Voltage clamping device 108 conducts during a transient event, enabling transient current to flow through voltage clamping device 108. Voltage clamping device 108 and filter capacitor 114, absorb most of the transient energy, thereby protecting components coupled to drive circuit 100 from the transient voltage.

Figure 3:
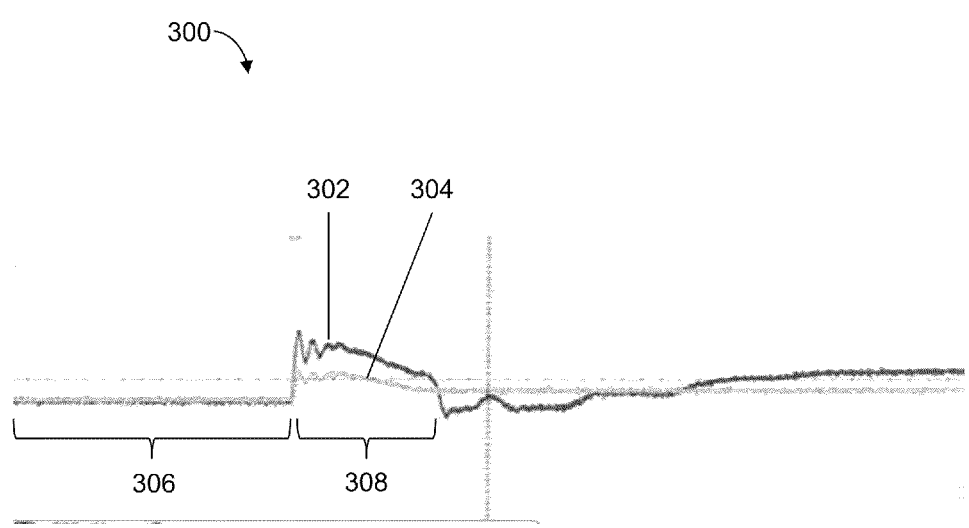
FIG. 3 is a graph illustrating voltage levels in the drive circuit shown in FIG. 2 during a transient event.

FIG. 3 is a graph 300 illustrating voltage levels in drive circuit 100 (shown in FIG. 2) during a transient event. In the exemplary embodiment, voltage clamping device 108 (shown in FIG. 2) is selected to have a clamping voltage of approximately 395V. Curve 302 represents a voltage across rectifier portion 102 (shown in FIG. 2) and curve 304 represents DC link voltage, which is supplied to inverter portion 104 (shown in FIG. 2). During normal operation 306 (i.e. $V_{RMS}$ ranges from 230V to 460V), curves 302 and 304 are constant and approximately equal, meaning that voltage across rectifier portion 102 and DC link voltage are approximately equal. During a transient event 308 of approximately 6 kV, voltage across rectifier portion 102 rises sharply. As voltage clamping device 108 begins to conduct, voltage across rectifier portion 102 is clamped at approximately 1.8 kV. As a result of the clamping of voltage across rectifier portion 102, DC link voltage is limited to a value of about 1.1 kV, as shown by curve 304.

Figure 4:
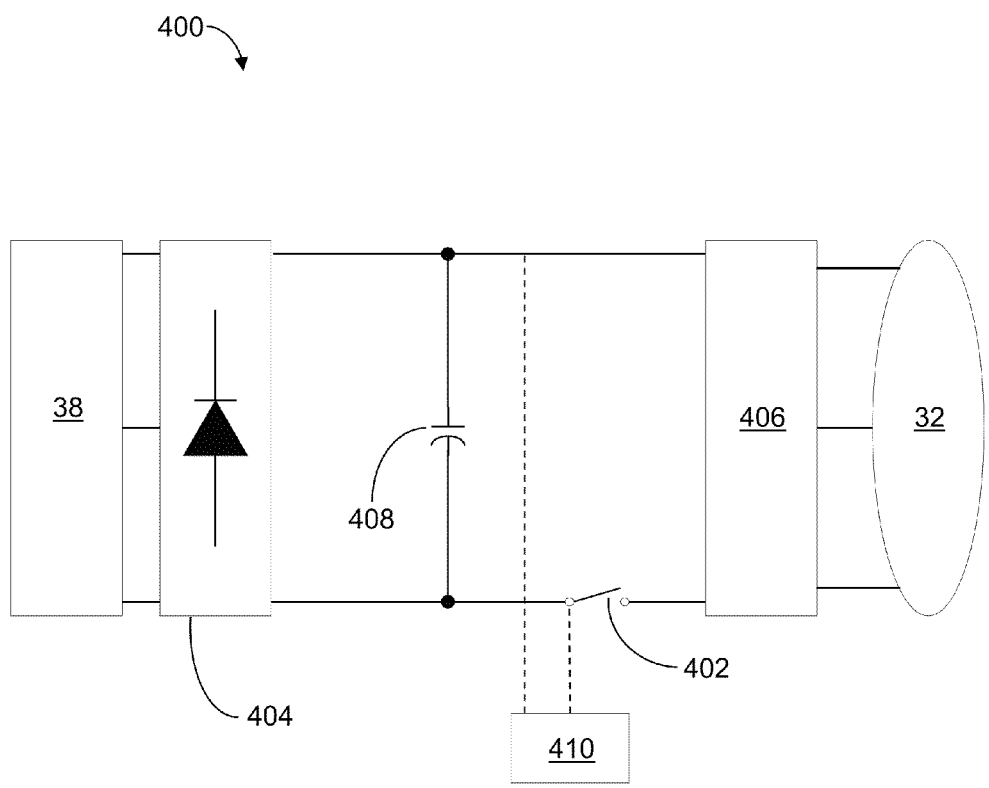
FIG. 4 is a block diagram of an exemplary drive circuit that includes over-voltage protection.

FIG. 4 is a block diagram of an exemplary drive circuit 400 that includes over-voltage protection. In the exemplary embodiment, drive circuit 400 includes a switching device 402 coupled between a rectifier portion 404 and an inverter portion 406. More specifically, switching device 402 is coupled between at least one filter capacitor 408 and inverter portion 406. In the exemplary embodiment, switching device 402 is a solid state switch. In alternative embodiments, switching device 402 may be any switching device that allows drive circuit 400 to function as described herein. Switching device 402 is configured to open upon detection of an over-voltage condition and disconnect inverter portion 406 from drive circuit 400. An over-voltage condition typically introduces a DC link over-voltage up to twice the normal DC link voltage (i.e. $V_{RMS}$ changes from 460V to 920V, which corresponds to DC link voltage changing from 650V to 1300V). Over-voltage conditions may last for extended periods of time, which can damage components of electric motor 32 (shown in FIG. 1).

In the exemplary embodiment, drive circuit 400 includes a controller 410 coupled to switching device 402. Controller 410 is configured to monitor a value of DC link voltage across capacitor 408 and selectively open switching device 402 upon detection of an over-voltage condition. To provide over-voltage condition protection, controller 410 continuously measures DC link voltage and compares it to a preset threshold. When DC link voltage exceeds the preset threshold, controller 410 opens switching device 402. Opening switching device 402 disconnects inverter portion 406 from filter capacitors 408 and prevents damage by the over-voltage condition. When the DC link voltage returns to a normal level, controller 410 closes switching device 402 enabling current to resume flowing to inverter portion 406.

Figure 5:
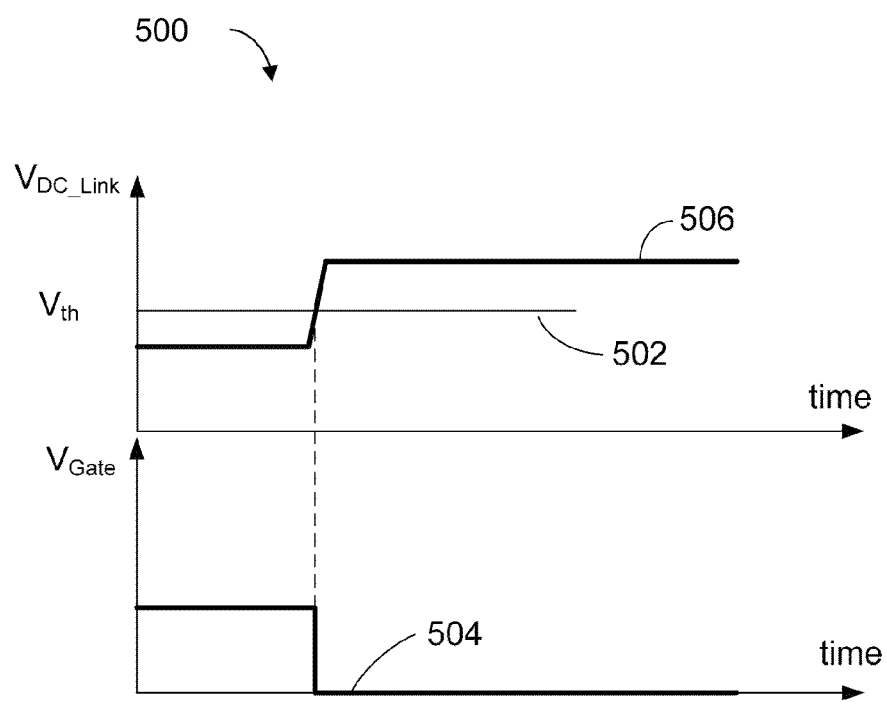
FIG. 5 is a graph illustrating a voltage of switching device shown in FIG. 4 as it relates to DC link voltage.

FIG. 5 is a graph 500 illustrating a voltage of switching device 402 (shown in FIG. 4) as it relates to DC link voltage across filter capacitor 408 (shown in FIG. 4). In the exemplary embodiment, a preset threshold 402 is set that defines an over-voltage condition. Voltage of switching device 402 is represented by reference number 504 and DC link voltage is represented by 506. While curve 506 remains lower than threshold 502, voltage 504 of switching device 402 is high, or powered on, enabling current to flow to motor 32 (shown in FIGS. 1 and 4). When controller 410 (shown in FIG. 4) measures a DC link voltage that exceeds threshold 502 (i.e., 850 V), voltage 504 of switching device 402 is lowered to zero, opening switching device 402 to prevent current from flowing to motor 32. Opening switching device 402 effectively disconnects inverter portion 406 (shown in FIG. 4) and, accordingly, electric motor 32 from filter capacitor 408. Switching device 402 remains open until DC link voltage returns to a normal level below threshold 502.

Figure 6:
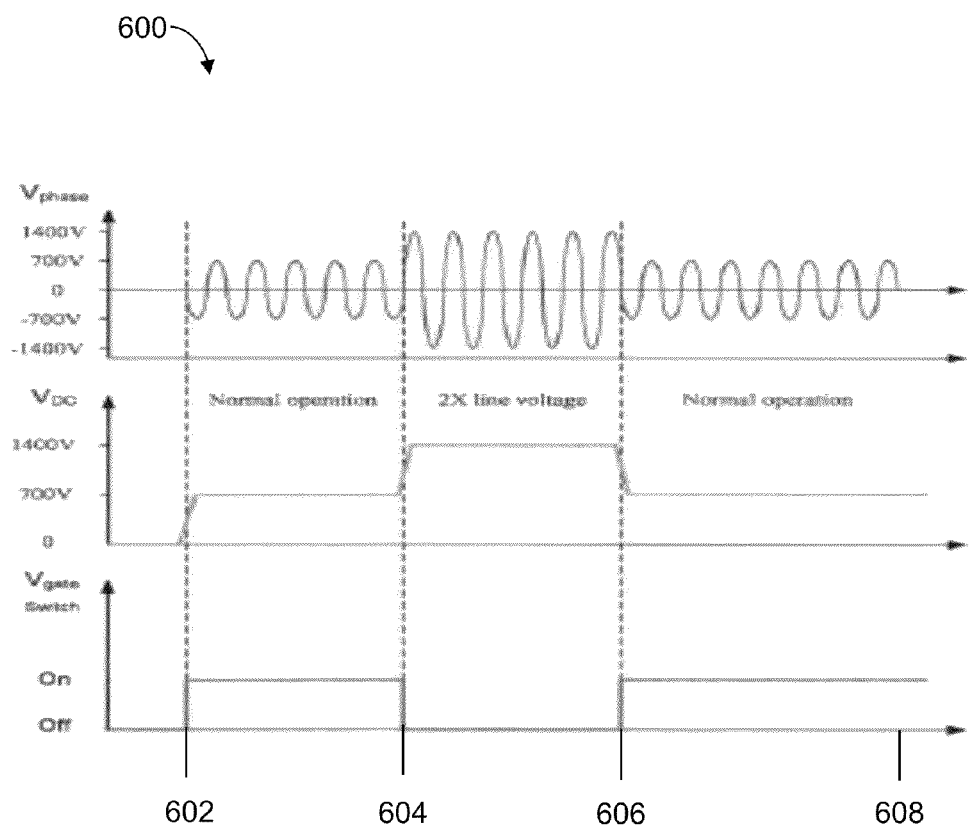
FIG. 6 is a graph showing an exemplary operation of the switching device shown in FIG. 4 during an over-voltage condition.

FIG. 6 is a graph 600 showing operation of switching device 402 (shown in FIG. 4) in drive circuit 400 (shown in FIG. 4) during an over-voltage condition. Regions 602 to 604 illustrate normal operation of drive circuit 400 (i.e., $V_{AC}$ peak voltage and $V_{DC}$ are approximately 700V). During normal operation in regions 602 to 604, switching device 402 is turned on, or closed, enabling current to flow to motor 32 (shown in FIGS. 1 and 4). Controller 410 (shown in FIG. 4) continuously measures DC link voltage in drive circuit 400. When an over-voltage condition occurs, for example, in regions 604 to 606, $V_{AC}$ peak voltage and $V_{DC}$ increase to approximately 1400V. Upon sensing the over-voltage condition, controller 410 sends a signal to turn switching device 402 off, or open, preventing current from flowing to motor 32. When the over-voltage condition is no longer detected as shown between regions 606 and 608, controller 410 sends a signal to turn switching device 402 back on, enabling current to flow to motor 32.

Figure 7:
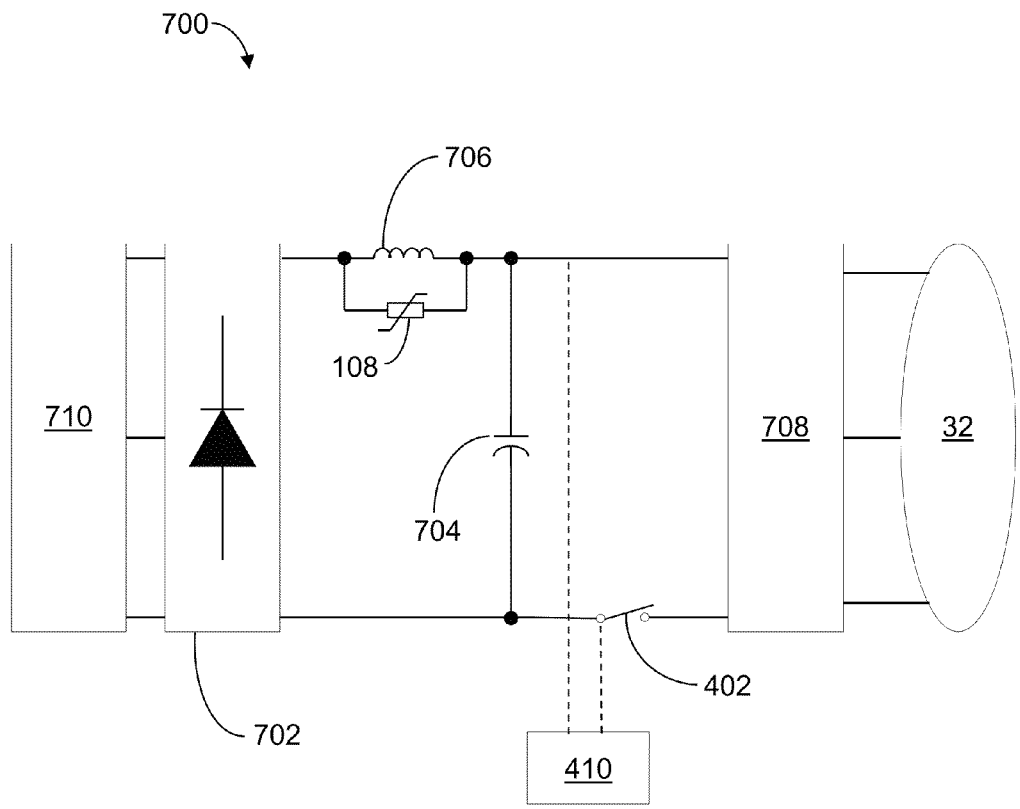
FIG. 7 is a block diagram of an exemplary drive circuit that includes transient and over-voltage protection.

FIG. 7 is a block diagram of an exemplary drive circuit 700 that includes transient and over-voltage protection. In the exemplary embodiment, drive circuit 700 includes a rectifier portion 702, at least one filter capacitor 704, at least one inductive device 706 coupled to rectifier portion 702 and filter capacitor 704, at least one voltage clamping device 108 (shown in FIG. 2) coupled in parallel with inductive device 706, and at least one switching device 402 (shown in FIG. 4) coupled to filter capacitor 704. Switching device 402 is also coupled to an inverter portion 708 for driving an electric motor 32 (shown in FIG. 1). In some embodiments, drive circuit 700 includes a controller 410 (shown in FIG. 4) for controlling operation of switching device 402. In the exemplary embodiment, rectifier portion 702 is coupled to a power supply 710 for receiving an input power signal. In the exemplary embodiment, voltage clamping device 108 operates in the same manner for providing transient voltage protection as described with regards to FIG. 2. Moreover, switching device 402 operates in the same manner to provide over-voltage protection as described with regards to FIG. 4.

Described herein are exemplary systems and drive circuits for protecting a motor controller from transient voltages and/or over-voltage conditions. The transient voltage is reduced or eliminated by using a voltage clamping device to limit the voltage delivered to the electric motor. The over-voltage condition is eliminated by disconnecting the drive circuit from an inverter portion of the motor controller.

The embodiments described herein facilitate efficient and economical motor controller protection in a variable speed drive. The exemplary embodiments are described and/or illustrated herein in detail. The embodiments are not limited to the specific embodiments described herein, but rather, components of each system and/or apparatus may be utilized independently and separately from other components and steps described herein. Each component may also be used in combination with other components.

When introducing elements/components/etc. of the systems and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A drive circuit comprising:
  a rectifier portion;
  an inverter portion coupled downstream from said rectifier portion;
  at least one inductive device having a first end coupled to said rectifier portion and a second end coupled to said inverter portion; and
  at least one voltage clamping device coupled in parallel to said at least one inductive device.

2. A drive circuit in accordance with claim 1, further comprising at least one filter capacitor, wherein said at least one inductive device is coupled between said rectifier portion and said at least one filter capacitor.

3. A drive circuit in accordance with claim 1, wherein said voltage clamping device is configured to prevent damage to said rectifier portion caused by exposure to a transient voltage.

4. A drive circuit in accordance with claim 1, wherein said voltage clamping device comprises one of a metal oxide varistor, a Zener diode, a transient voltage suppression diode, and a gas-filled tube.

5. A drive circuit comprising:
  a rectifier portion;
  an inverter portion coupled downstream from said rectifier portion;
  at least one switching device coupled between said rectifier portion and said inverter portion, said at least one switching device configured to open as a function of a direct current, DC, link voltage value.

6. A drive circuit in accordance with claim 5, further comprising at least one filter capacitor, wherein the DC link voltage value is voltage across said at least one filter capacitor.

7. A drive circuit in accordance with claim 5, further comprising at least one controller coupled to said at least one switching device, said at least one controller configured to measure the DC link voltage value.

8. A drive circuit in accordance with claim 7, wherein said at least one controller controls operation of said at least one switching device.

9. A drive circuit in accordance with claim 5, wherein said switching device is configured to prevent damage to said drive circuit caused by exposure to an over-voltage condition.

10. A system comprising:
a motor controller;
an electric motor coupled to said motor controller, said electric motor configured to receive an operating signal from said motor controller; and
a drive circuit coupled to said motor controller, said drive circuit configured to provide electrical power and control signals to said electric motor, said drive circuit comprising:
a rectifier portion;
an inverter portion coupled downstream from said rectifier portion;
at least one inductive device having a first end coupled to said rectifier portion and a second end coupled to said inverter portion;
at least one voltage clamping device coupled in parallel with said at least one inductive device, said at least one voltage clamping device configured to prevent damage caused by a transient voltage; and
at least one switching device coupled between said rectifier portion and said inverter portion, said at least one switching device configured to open as a function of a direct current, DC, link voltage value.

11. A system in accordance with claim 10, further comprising at least one filter capacitor, wherein said at least one inductive device is coupled between said rectifier portion and said at least one filter capacitor.

12. A system in accordance with claim 10, wherein said drive circuit further comprises at least one controller coupled to said at least one switching device, said at least one controller configured to measure the DC link voltage value.

13. A system in accordance with claim 12, wherein said at least one controller controls operation of said at least one switching device.

14. A system in accordance with claim 10, wherein said voltage clamping device is configured to prevent damage caused by a transient voltage and said switching device is configured to prevent damage caused by an over-voltage condition.

15. A drive circuit comprising:
a rectifier portion;
an inverter portion coupled downstream from said rectifier portion;
at least one inductive device having a first end coupled to said rectifier portion and a second end coupled to said inverter portion, said at least one inductive device further coupled to said at least one filter capacitor;
at least one voltage clamping device coupled in parallel with said at least one inductive device, said at least one voltage clamping device configured to prevent damage to said drive circuit caused a transient voltage; and
at least one switching device coupled to said at least one filter capacitor, said at least one switching device configured to open as a function of a direct current (DC) link voltage value.

16. A drive circuit in accordance with claim 15, wherein said voltage clamping device is configured to prevent damage to said rectifier portion caused by exposure to a transient voltage.

17. A drive circuit in accordance with claim 15, further comprising at least one filter capacitor, wherein said at least one inductive device is coupled between said rectifier portion and said at least one filter capacitor.

18. A drive circuit in accordance with claim 15, further comprising at least one controller coupled to said at least one switching device, said at least one controller configured to measure the DC link voltage value and to control operation of said at least one switching device.

19. A drive circuit in accordance with claim 15, wherein said switching device is configured to prevent damage to said drive circuit caused by exposure to an over-voltage condition.

* * * * *